United States Patent
Li

(10) Patent No.: US 10,621,766 B2
(45) Date of Patent: Apr. 14, 2020

(54) CHARACTER INPUT METHOD AND DEVICE USING A BACKGROUND IMAGE PORTION AS A CONTROL REGION

(71) Applicant: BOE TECHNOLOGY GROUP CO., LTD., Beijing (CN)

(72) Inventor: Yingjie Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 168 days.

(21) Appl. No.: 15/783,618

(22) Filed: Oct. 13, 2017

(65) Prior Publication Data

US 2018/0268585 A1    Sep. 20, 2018

(30) Foreign Application Priority Data

Mar. 15, 2017    (CN) .......................... 2017 1 0153958

(51) Int. Cl.
*G06T 11/60* (2006.01)
*G06F 1/16* (2006.01)
*G06F 3/03* (2006.01)
*G06F 3/01* (2006.01)

(52) U.S. Cl.
CPC .............. *G06T 11/60* (2013.01); *G06F 1/163* (2013.01); *G06F 3/011* (2013.01); *G06F 3/0304* (2013.01); *G06F 3/017* (2013.01)

(58) Field of Classification Search
CPC ...... G06F 3/048–04897; G06T 19/006; G02B 27/01–0189; G02B 2027/0105–0198; H04N 13/332
See application file for complete search history.

(56) References Cited

U.S. PATENT DOCUMENTS

| | | | | |
|---|---|---|---|---|
| 7,785,201 B2 * | 8/2010 | Hashimoto | ............ | A63F 13/10 463/36 |
| 9,292,082 B1 | 3/2016 | Patel et al. | | |
| 9,928,650 B2 * | 3/2018 | Inomata | ................ | G06F 3/0346 |
| 2011/0037780 A1 * | 2/2011 | Abrahamsson | ...... | G11B 27/105 345/666 |
| 2013/0187858 A1 * | 7/2013 | Griffin | .................. | G06F 3/0237 345/168 |

(Continued)

FOREIGN PATENT DOCUMENTS

| | | |
|---|---|---|
| CN | 104076512 A | 10/2014 |
| CN | 105094320 A | 11/2015 |

(Continued)

OTHER PUBLICATIONS

First Office Action for Chinese Patent Application No. 201710153958.8 dated Apr. 17, 2019.

(Continued)

*Primary Examiner* — Gene W Lee
(74) *Attorney, Agent, or Firm* — Calfee, Halter & Griswold LLP

(57) ABSTRACT

The present disclosure relates to a character input method, a character input device, and a wearable device. The character input method includes: acquiring a background image; determining a portion of the background image as a control region; superimposedly displaying a character input interface and the background image; and moving the control region relative to the character input interface to select a particular character in the character input interface.

18 Claims, 6 Drawing Sheets

(56) References Cited

U.S. PATENT DOCUMENTS

| | | | | |
|---|---|---|---|---|
| 2013/0326428 A1* | 12/2013 | Liu | ................... | G06F 3/04812 |
| | | | | 715/856 |
| 2015/0049113 A1* | 2/2015 | Rahman | ............... | G06T 19/006 |
| | | | | 345/633 |
| 2016/0379397 A1* | 12/2016 | Zhou | ....................... | G06T 13/80 |
| | | | | 715/815 |
| 2017/0315365 A1* | 11/2017 | Shen | ................. | G02B 27/0176 |

FOREIGN PATENT DOCUMENTS

| CN | 105955453 A | 9/2016 |
|---|---|---|
| CN | 108121438 A | 6/2018 |

OTHER PUBLICATIONS

Jabeen, Farzana, et al., "Virtual Mouse for Wearable Display" CAAI Transactions on Intelligent Systems, vol. 12, No. 2, Apr. 2017. DOI: 10.11992/tis.201608003.

* cited by examiner

CHARACTER INPUT METHOD AND DEVICE USING A BACKGROUND IMAGE PORTION AS A CONTROL REGION

CROSS-REFERENCES TO RELATED APPLICATIONS

This application claims priority to Chinese Patent Application No. 201710153958.8 filed in China on Mar. 15, 2017, the entire contents of which are hereby incorporated by reference.

TECHNICAL FIELD

The present disclosure relates to the field of human-computer interaction technology, and more particularly, to a character input method, a character input device, and a wearable device.

BACKGROUND

With the development of industries such as Augmented Reality (AR), Virtual Reality (VR), many monocular ARs, binocular ARs and VR products have been used by a large number of users. These devices usually have a limited number of keys, thus peripherals such as a mouse or a keyboard is needed to assist inputting certain character information in cases where a user name, a password, search information, etc., is to be input. This is inconvenient for such wearable products to connect theses peripherals.

It should be noted that, information disclosed in the above background portion is provided only for better understanding of the background of the present disclosure, and thus it may contain information that does not form the prior art known by those ordinary skilled in the art.

SUMMARY

Aspects of the present disclosure provide a character input method, a character input method and a wearable device.

According to one aspect of the present disclosure, there is provided a character input method, including:

acquiring a background image;

determining a portion of the background image as a control region;

superimposedly displaying a character input interface and the background image; and moving the control region relative to the character input interface to select a particular character in the character input interface.

According to another aspect of the present disclosure, there is provided a character input device, including:

an image acquiring module, configured to acquire a background image;

a determining module, configured to determine a portion of the background image as a control region;

a display module, configured to superimposedly display a character input interface and the background image; and a selecting module, configured to move the control region relative to the character input interface to select a particular character in the character input interface.

According to another aspect of the present disclosure, there is provided a wearable device, including:

a processor; and a memory storing computer-readable instructions, wherein, when the computer readable instructions stored in the memory are executed, the processor is configured to perform the character input method according to the present disclosure.

According to another aspect of the present disclosure, there is provided a wearable device including the character input device according to the present disclosure.

It is to be understood that both the foregoing general description and the following detailed description are exemplary and explanatory only and are not restrictive of the present disclosure, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

The drawings are intended to provide a further understanding of the present disclosure and constitute a part of the specification, together with the following detailed description, for purposes of this disclosure, but are not to be construed as limiting the scope of the disclosure. In the drawings.

DETAILED DESCRIPTION

A character input method, a character input device, and a wearable device provided in the present disclosure will be described in further detail below in combination with the drawings and specific embodiments, in order to provide a better understanding of the technical solution of the present disclosure for those skilled in the art.

Figure 1:
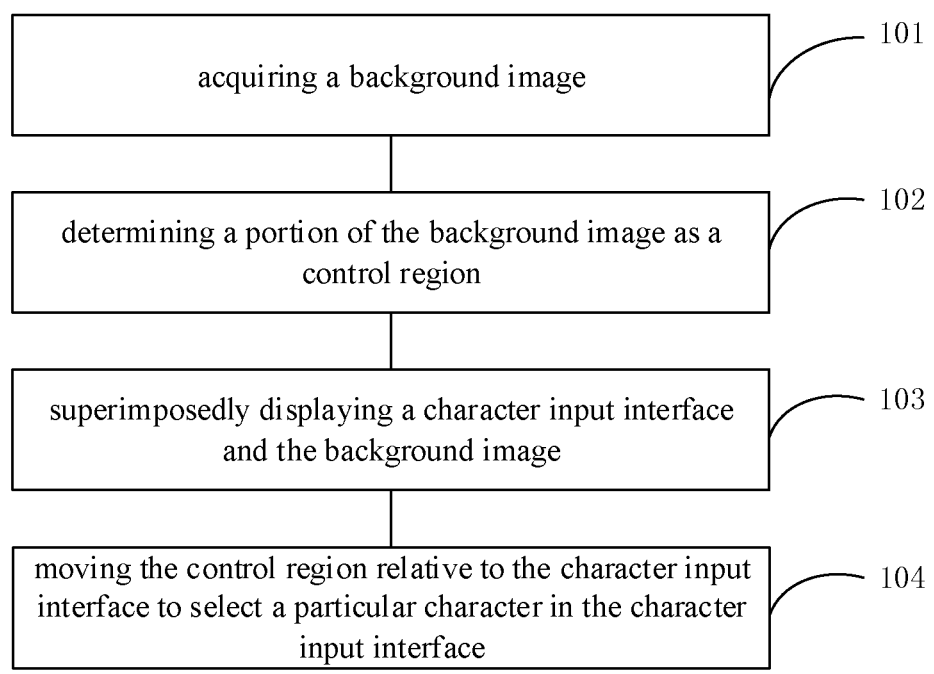
FIG. 1 is a flow chart of a character input method according to an embodiment of the present disclosure.

FIG. 1 is a flow chart of a character input method according to an embodiment of the present disclosure. Referring to FIG. 1, a character input method according to an embodiment of the present disclosure includes following steps: step 101, acquiring a background image; step 102, determining a portion of the background image as a control region; step 103, superimposedly displaying a character input interface and the background image; and step 104, moving the control region relative to the character input interface to select a particular character in the character input interface.

The above-described embodiment of the present disclosure may be used for character input in devices such as AR, VR and the like. Specifically, devices such as AR, VR, or the like are generally worn on a head of a user and have a camera for capturing an image or a signal source for providing an image signal, and a display apparatus for displaying the image to a user. When the head of the user moves, the image displayed on the display apparatus may be moved accordingly.

According to the above-described embodiment of the present disclosure, for example, the user may acquire the image, such as an image of ambient environment of the user, using the camera. Then, the image is analyzed, to determine a portion of the image as a control region. According to the present embodiment, the control region may be marked to facilitate operation of the user. For example, the control region may be marked with a color box or the like in the image. However, the present disclosure is not limited thereto.

In the present embodiment, a character input interface and the image acquired by the camera are superimposedly displayed. For example, the character input interface is displayed above the acquired image with a certain degree of transparency. However, the present disclosure is not limited thereto, and the image acquired by the camera and the control region may be displayed above the character input interface with a certain degree of transparency.

At this time, the user may move the camera to move the acquired image relative to the character input interface, such that the control region is also moved relative to the character input interface, to select a specific character in the character input interface using the control region.

It should be noted that, although the steps are described in terms of 101, 102 and the like in the present embodiment, it will be understood by those skilled in the art that the above-mentioned reference numerals are not intended to define an order or a priority of respective steps. In contrast, the above steps may be performed in any possible order. For example, the step of determining the control region may be performed after the character input interface and the image acquired by the camera are superimposedly displayed.

Figure 2:
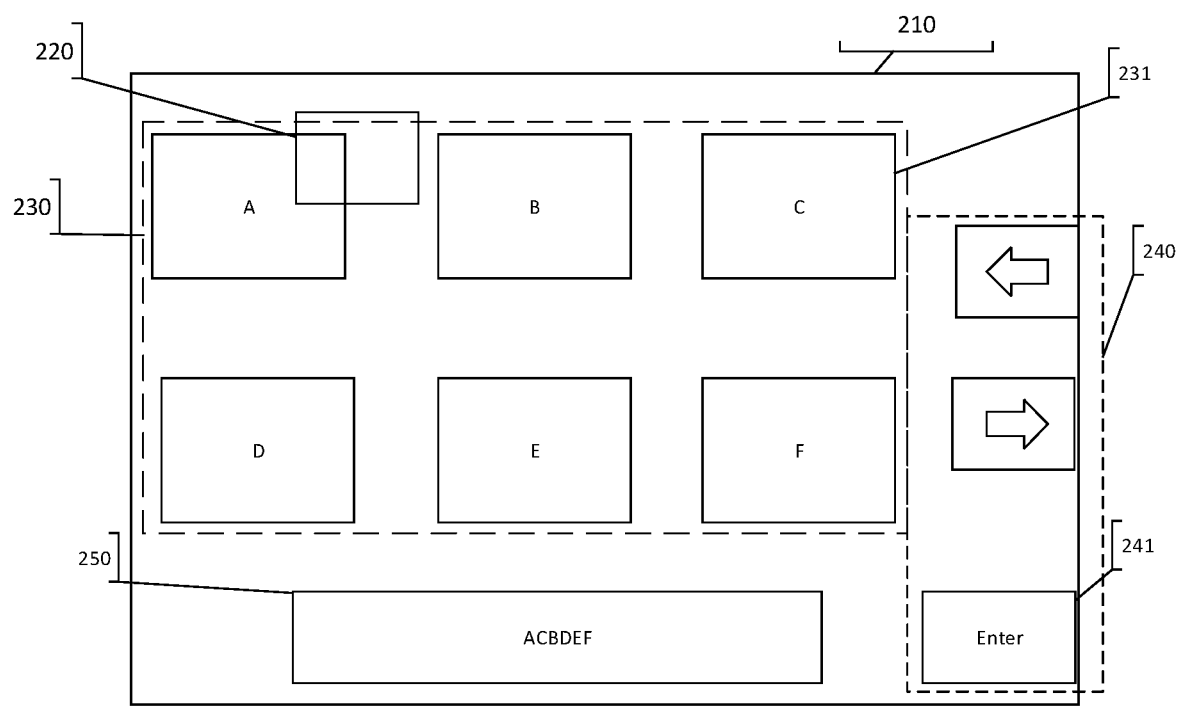
FIG. 2 is a schematic diagram of a human-computer interaction interface of a character input method according to an embodiment of the present disclosure.

FIG. 2 is a schematic diagram of a human-computer interaction interface of a character input method according to an embodiment of the present disclosure. Referring to FIG. 2, in a character input method according to an embodiment of the present disclosure, the human-computer interaction interface may include: an image background 210, a control region 220, a candidate character input region 230, a control input region 240, and an input box 250.

The image background 210 may be formed by using images acquired by a camera. For sake of clarity, the image acquired by the camera is shown as a pure white image in the present embodiment, but it will be understood by those skilled in the art that it may represent an image of a scene around the user acquired by the camera.

In the image background 210, the region 220 marked with a box is determined as the control region 220. The control region 220 may be a region having a certain feature in the image background. For example, the control region 220 may be a region which has a brightness different from a brightness of other regions. For example, the brightest or darkest region in the image background 210 may be determined as the control region 220. However, the present disclosure is not limited thereto, and other regions in the image background 210 may also be determined as the control region 220 as long as operability of the user is satisfied.

In the human-computer interaction interface, the character input interface is superimposedly displayed above the image background 210. The character input interface may have a certain degree of transparency, to avoid blocking environment information acquired by the user through the camera.

The character input interface includes a candidate character input region 230, a control input region 240, and an input box 250.

The character input region 230 includes at least one character 231 for providing user input. For example, the character 231 may include characters such as English letters, Chinese strokes, numbers, punctuation marks or the like which may be input through the character input interface. The plurality of characters 231 may be arranged in an arrangement manner of the 10-key, the QWERTY keyboard or the like, and may also be arranged in an arrangement manner of a circle or a square around a center of the image background, which is not limited by the present disclosure.

The control input region 240 includes at least one control key 241. The control key 241 may include, for example, an enter key. When the user presses the enter key, operations such as confirmation of input contents and the line feed or the like may be executed. In addition, the control key 241 may further include a function key such as a flip key, a backspace key, a cursor movement key, an input method switching key, and the like, thereby realizing various functions of the character input interface.

The input box 250 may be located at one side of the image background 210, for example below the image background 210. However, the present disclosure is not limited thereto, and the input box 250 may be located at any suitable location as desired. When a user inputs a specific character by selecting a character 231, the character may be displayed in the input box 250, such that the user may learn about the input contents at any time, for confirmation or modification. When the user finishes the input, the input may be confirmed by a corresponding control key 241 in the control input region 240. For example, the character in the input box 250 may be input to a system (or a currently running application) by selecting the enter key (or a completion key) or the like, and the character input interface may be exited accordingly, to complete the input of the character.

A human-computer interaction interface that can be used in the character input method of the present disclosure is described by way of example, however, it will be understood by those skilled in the art that specific information in the above examples, such as a type of the character, a shape/an arrangement of the key, a type of the key or the like is are an example to implement the present disclosure and not intended to limit the present disclosure in any way.

Figure 3:
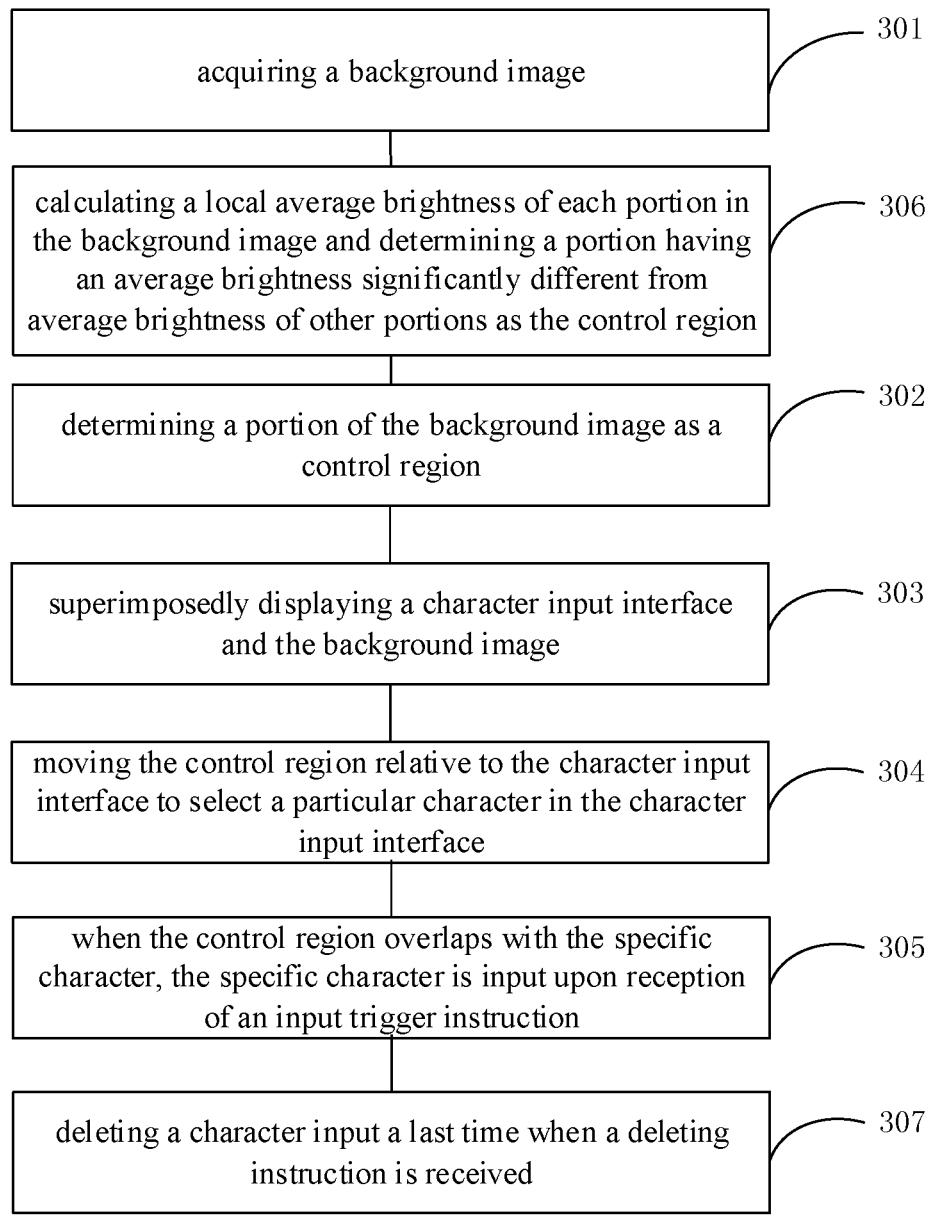
FIG. 3 is a flow chart of a character input method according to an embodiment of the present disclosure.

FIG. 3 is a flow chart of a character input method according to an embodiment of the present disclosure.

Referring to FIG. 3, the character input method according to the present embodiment includes: step 301: acquiring a background image; step 302: determining a portion of the background image as a control region; step 303: superimposedly displaying a character input interface and the background image; and step 304: moving the control region relative to the character input interface to select a particular character in the character input interface.

The above steps 301-304 are substantially the same as steps 101-104 according to the foregoing embodiments of the present disclosure, which may be referred to description in the foregoing embodiments and will not be repeated herein.

According to the present embodiment, the character input method further includes: step 305, when the control region overlaps with the specific character, inputting the specific character upon reception of an input trigger instruction.

In the present embodiment, the user moves his/her head, such that the control region moves relative to the character input interface, and the character that he/she desires to input is selected by the control region. In this case, when the control region overlaps with a specific character, the character that is currently overlapped with the control region may be input by inputting a trigger instruction.

According to the present disclosure, the trigger instruction may be automatically generated when a predetermined condition is satisfied or when a user input is received. For example, in one embodiment of the present disclosure, when an overlapping time of the control region and the character reaches a predetermined threshold, it may be determined that the trigger condition is reached, so that a trigger instruction may be issued to input the currently overlapped character. For example, in the example of FIG. 2, when the control region 220 is overlapped with the character "A" as the background image 210 moves, if the overlapping time reaches a predetermined threshold value, for example, 3 seconds, the character "A" is input to the input box 250. The threshold may be preset according to accuracy of the device and operating habit of the user. Alternatively, the threshold may also be changed according to actual needs of the user. The present disclosure is not limited to the present specific embodiments.

Similarly, when a moving range of the control region relative to the currently overlapped character within a predetermined time is less than the predetermined threshold, it may be determined that the trigger condition is reached, so that a trigger instruction may be issued to input the currently overlapped character. For example, in the embodiment of FIG. 2, when the control region 220 is overlapped with the character "A" as the background image 210 moves, if the movement of the control region 220 relative to a position of the character "A" within a predetermined time, for example 3s, does not exceed 3 mm×3 mm, the character "A" is input to the input box 250. The threshold may be preset according to accuracy of the device and operating habit of the user. Alternatively, threshold may also be varied according to actual needs of the user. The present disclosure is not limited to the present specific embodiments.

Two specific examples of trigger instructions are given by way of example above, but the present disclosure is not limited thereto. For example, it is possible to determine, by other conditions, that a specific trigger condition is satisfied, thereby issuing a trigger instruction correspondingly to input the currently overlapped character. Alternatively, an instruction additionally input by the user may also be used as the trigger instruction to input the current character. For example, the user may click a button (a specific button on the device), issue a sound instruction (e.g., a preset voice or tone), a gesture instruction (e.g., a specific gesture done before the camera), an action instruction (e.g., nodding or other actions when the device is worn), and all the above various manners may be served as a trigger instruction.

In the present embodiment, referring to FIG. 3, the method further includes: step 306, calculating a local average brightness of each portion in the background image and determining a portion having an average brightness significantly different from average brightness of other portions as the control region.

According to the present embodiment, the control region may be determined by the brightness of the picture acquired by the camera. Specifically, a local average brightness of each portion in the image may be calculated and a portion having an average brightness significantly different from average brightness of other portions may be determined as the control region.

More specifically, according to the present embodiment, a RGB value of the background image may be converted into brightness, and then the local average brightness value of each portion is calculated. For example, in the non-limiting embodiment, the local brightness average value may be calculated as for a region of 7 mm×7 mm. However, the present disclosure is not limited thereto, and a size of the region of calculating the local brightness may be adjusted according to actual needs. In one embodiment, the size of the region of calculating the local brightness may be the same as or similar to a size of the control region that is desired to be formed.

In daily life, the images taken by the camera usually have portions with different brightness. For example, the brightness of a shaded or recessed portion is generally lower than that of a light source (reflection source) portion or protrusion portion. Therefore, in the present embodiment, by calculating the local brightness of each portion in the image, it is possible to easily find a portion where the brightness of the image is different from that of other portions. Such a portion generally has a strong degree of recognition, so that it facilitates operations of the user by taking such a portion as the control region.

For example, a darker region in the image may be selected as the control region. For example, the control region may be selected as a portion with the lowest average brightness in the image. The advantage of such a control region lies in that the portion with the lowest brightness in the picture is relatively easy to be found. Besides, since the brightness of the control region is the lowest, it is more conductive to clearly recognizing the content displayed on the character input interface when the control region and the character input interface are overlappedly displayed.

In addition, even if a portion having a low brightness is difficult to be found in an environment with extremely high brightness, a portion with low brightness may be artificially created by the user in the picture. For example, the user may clench his/her fist and place in front of the camera, and in this case, the portion between the user's fingers will naturally form a darker picture, thereby taking a portion with a low brightness formed in the picture as the control region.

The above provides an example of how to determine the control region only by way of example, however it will be understood by those skilled in the art that there may be other ways to determine the control region in the image. In one example, a specific location of the image may be determined as the control region. For example, a central region of the initial image is taken as the control region. In addition, in the above example, the control region is formed by manufacturing the low brightness region by the user's hand, but the present disclosure is not limited thereto. In another example, the control region may also be determined by identifying a particular object located in front of the camera and acquired into the image. The particular object may be, for example, a human hand, or a specific marker, symbol, or the like.

According to the present embodiment, the character input method may further include: step 307, deleting a character input a last time when a deleting instruction is received.

In the present embodiment, when the user finds that a character that the user does not wish to input is input due to erroneous input or misoperation, the user may delete the character input the last time through the deleting instruction. In one embodiment, the deleting instruction may be generated by blocking the camera. For example, when it is found that the brightness of the image is reduced to a specific threshold, it may be determined that the camera is blocked by the user, such that a deleting instruction may be generated to delete the character input the last time. For example, when the brightness of the image is reduced to 70% and lasts for a certain period of time, for example, 3 seconds, it may be determined that the camera is blocked by the user, thereby issuing a deleting instruction to delete the character input the last time. As another example, the deleting instruction may be generated through the camera moving according to a predetermined motion mode. For example, when the head wears a wearable device, the user may generate the deleting instruction by shaking his head. In addition, the user may also delete the character input the last time by inputting other deleting instructions, and the present disclosure is not limited to the above example.

It should be noted that input of nodding and shaking the head of the user may be similar to the movement manner of the camera when the particular character is selected, but it may be distinguished by using the following facts. When the user selects a character, in order to align the control region with the particular character, the camera will be usually moved carefully, and thus the movement of the camera is generally slow and linear. However, when the user nods or shakes his head, the camera will move back and forth quickly in short time. Therefore, it is possible to distinguish the camera movement for the search of characters from operations of nodding or shaking the head for the control by setting a predetermined threshold or pattern.

In summary, in the character input method according to the present disclosure, it is possible to acquire a background image; determine a portion of the background image as a control region; superimposedly display a character input interface and the background image; and move the control region relative to the character input interface to select a particular character in the character input interface. Therefore, it is very convenient for the input of characters on devices such as VR and AR which are inconvenient to use a mouse or a keyboard, the accuracy is high, and it is easier to operate.

Figure 4:
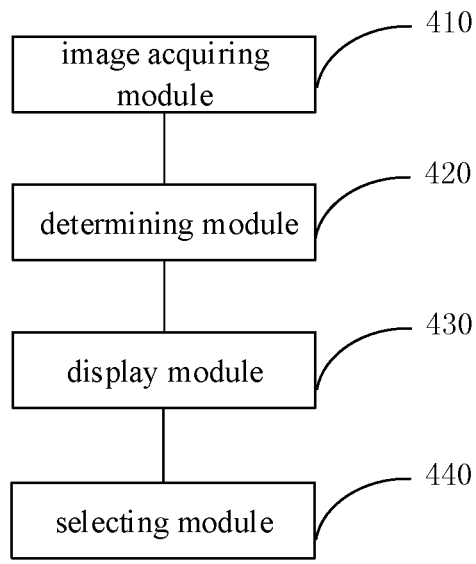
FIG. 4 is a schematic diagram of a character input device according to an embodiment of the present disclosure.

FIG. 4 is a schematic diagram of a character input device according to an embodiment of the present disclosure. Referring to FIG. 4, a character input device 400 according to an embodiment of the present disclosure includes: an image acquiring module 410, configured to acquire a background image; a determining module 420, configured to determine a portion of the background image as a control region; a display module 430, configured to superimposedly display a character input interface and the background image; and a selecting module 440, configured to move the control region relative to the character input interface to select a particular character in the character input interface.

In one embodiment, the selecting module 440 may further be configured to: when the control region overlaps with the specific character, input the specific character upon reception of an input trigger instruction.

In another embodiment, the character input device 400 may further include a deleting module 450 configured to delete a character input a last time in response to a deleting instruction.

Figure 5:
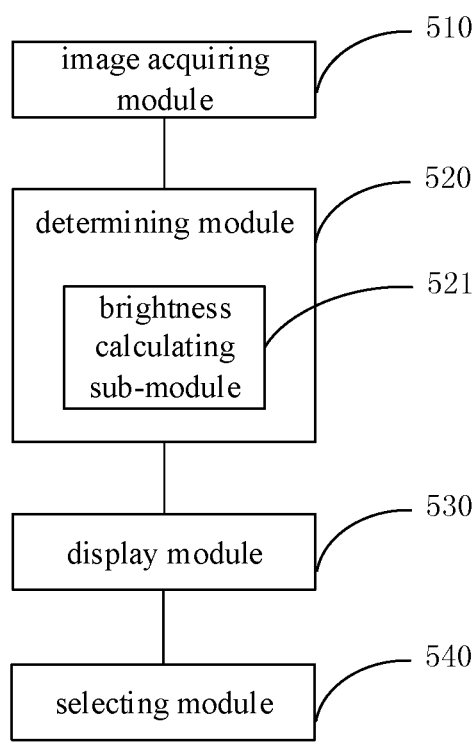
FIG. 5 is a schematic diagram of a character input device according to an embodiment of the present disclosure.

FIG. 5 is a schematic diagram of a character input device according to an embodiment of the present disclosure. Referring to FIG. 5, a character input device 500 according to an embodiment of the present disclosure includes: an image acquiring module 510, configured to acquire a background image; a determining module 520, configured to determine a portion of the background image as a control region; a display module 530, configured to superimposedly display a character input interface and the background image; and a selecting module 540, configured to move the control region relative to the character input interface to select a particular character in the character input interface.

In the present embodiment, the determining module 520 may further include: a brightness calculating sub-module 521 configured to calculate a local average brightness of each portion in the background image and determine a portion having an average brightness significantly different from average brightness of other portions as the control region.

Figure 6:
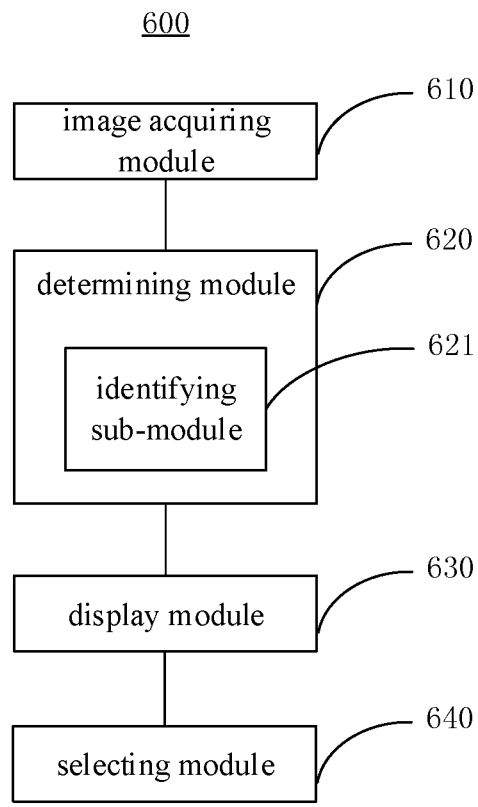
FIG. 6 is a schematic diagram of a character input device according to an embodiment of the present disclosure.

FIG. 6 is a schematic diagram of a character input device according to an embodiment of the present disclosure. Referring to FIG. 6, a character input device 600 according to an embodiment of the present disclosure includes: an image acquiring module 610, configured to acquire a background image; a determining module 620, configured to determine a portion of the background image as a control region; a display module 630, configured to superimposedly display a character input interface and the background image; and a selecting module 640, configured to move the control region relative to the character input interface to select a particular character in the character input interface. In the present embodiment, the image acquiring module 610 may include a camera, the determining module 620 may further include an identification sub-module 621 configured to identify a particular object located in front of the camera, the control region being a specific object located in front of the camera and acquired into the background image.

Various components of the character input device according to the present disclosure may be implemented by a module configured to perform software, hardware, or hardware and software combination according to various method steps of the foregoing embodiments of the present disclosure. More specifically, reference may be made to the foregoing embodiments, which will not be repeated herein.

In summary, in the character input device according to the present disclosure, it is possible to acquire a background image; determine a portion of the background image as a control region; superimposedly display a character input interface and the background image; and move the control region relative to the character input interface to select a particular character in the character input interface. Therefore, it is very convenient for the input of characters on devices such as VR and AR which are inconvenient to use a mouse or a keyboard, the accuracy is high, and it is easier to operate.

Figure 7:
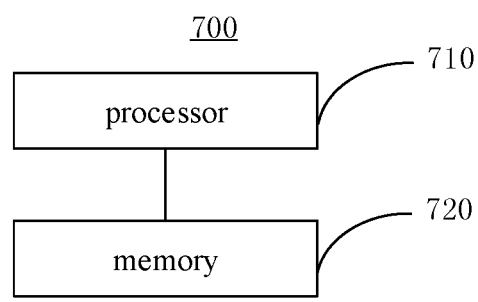
FIG. 7 is a schematic view of a wearable device according to an embodiment of the present disclosure.

FIG. 7 is a schematic view of a wearable device according to an embodiment of the present disclosure. Referring to FIG. 7, the wearable device 700 includes: a processor 710; and a memory 720 storing computer-readable instructions. According to the present embodiment, when the computer readable instructions stored in the memory are executed, the processor is configured to perform the character input method described by the foregoing embodiments.

Figure 8:
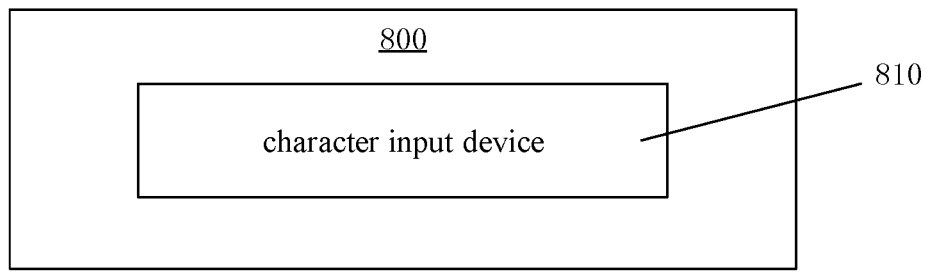
FIG. 8 is a schematic view of a wearable device according to an embodiment of the present disclosure.

FIG. 8 is a schematic view of a wearable device according to an embodiment of the present disclosure. Referring to FIG. 8, a wearable device 800 according to the present disclosure includes a character input device 810, which may be the character input device according to the forgoing embodiments of the present disclosure.

According to the above-described embodiment of the present disclosure, the wearable device may be a display device having a camera, such as monocular AR glasses, binocular AR glasses, an AR intelligent device or the like. In addition, the wearable device may also be a VR device, such as VR glasses, a VR display device, or the like. It should be noted that, in the present disclosure, although the current background image may be acquired by the camera, the present disclosure is not limited thereto. The background image may also be an image provided by a signal source and capable of moving with motion of the head of the user. For example, in a VR game, an image displayed on the VR device may move correspondingly with motion of the user's head, which is consistent with the corresponding movement manner of the image taken with the camera. In this way, the image generated by imitating the movement of the camera may also be applied to the character input method and the character input device of the present disclosure.

In summary, in the wearable device according to the present disclosure, it is possible to acquire a background image; determine a portion of the background image as a control region; superimposedly display a character input interface and the background image; and move the control region relative to the character input interface to select a particular character in the character input interface. Therefore, it is very convenient for the input of characters on devices such as VR and AR which are inconvenient to use a mouse or a keyboard, the accuracy is high, and it is easier to operate.

It is to be understood that the above embodiments are merely illustrative embodiments for the purpose of illustrating the principles of the present disclosure. However, the present disclosure is not limited thereto. It will be apparent to those skilled in the art that various variations and improvements may be made therein without departing from the spirit and essence of the present disclosure, which are also considered to be within the protection scope of the present disclosure.

What is claimed is:

1. A character input method, comprising:
    acquiring a background image;
    determining a portion of the background image as a control region;
    superimposedly displaying a character input interface and the background image; and
    moving the control region relative to the character input interface to select a particular character in the character input interface,
    wherein the determining a portion of the background image as a control region comprises: calculating a local average brightness of each portion in the background image and determining a portion having an average brightness significantly different from average brightness of other portions as the control region.

2. The character input method according to claim 1, wherein when the control region overlaps with the specific character, the specific character is input upon reception of an input trigger instruction.

3. The character input method according to claim 2, wherein the trigger instruction is generated when at least one of following conditions is satisfied:
    an overlapping time reaching a predetermined threshold;
    a moving range of the control region relative to the specific character within a predetermined time being less than the predetermined threshold; and
    receiving a user input.

4. The character input method according to claim 1, wherein the control region is a portion having a lowest average brightness in the background image.

5. The character input method according to claim 1, wherein the background image is acquired by a camera, and the determining a portion of the background image as a control region comprises: the control region being a specific object located in front of the camera and acquired into the background image.

6. The character input method according to claim 1, further comprising:
    deleting a character input a last time when a deleting instruction is received.

7. The character input method according to claim 6, wherein the deleting instruction is generated when at least one of following conditions is satisfied:
    a camera being blocked;
    the camera moving according to a predetermined motion mode;
    receiving a user input.

8. A wearable device, comprising:
    a processor; and
    a memory storing computer-readable instructions,
    wherein, when the computer readable instructions stored in the memory are executed, the processor is configured to perform;
    acquiring a background image;
    determining a portion of the background image as a control region;
    superimposedly displaying a character input interface and the background image; and
    moving the control region relative to the character input interface to select a particular character in the character input interface,
    wherein the determining a portion of the background image as a control region comprises: calculating a local average brightness of each portion in the background image and determining a portion having an average brightness significantly different from average brightness of other portions as the control region.

9. The wearable device according to claim 8, wherein when the control region overlaps with the specific character, the specific character is input upon reception of an input trigger instruction.

10. The wearable device according to claim 9, wherein the trigger instruction is generated when at least one of following conditions is satisfied:
    an overlapping time reaching a predetermined threshold;
    a moving range of the control region relative to the specific character within a predetermined time being less than the predetermined threshold; and
    receiving a user input.

11. The wearable device according to claim 8, wherein the control region is a portion having a lowest average brightness in the background image.

12. The wearable device of claim 8, the processor is further configured to perform:
    deleting a character input a last time when a deleting instruction is received.

13. The wearable device of claim 12, wherein the deleting instruction is generated when at least one of following conditions is satisfied:
    a camera being blocked;
    the camera moving according to a predetermined motion mode;
    receiving a user input.

14. A wearable device, comprising:
    a processor; and
    a memory storing computer-readable instructions,
    wherein, when the computer readable instructions stored in the memory are executed, the processor is configured to perform;
    acquiring a background image;
    determining a portion of the background image as a control region;
    superimposedly displaying a character input interface and the background image; and moving the control region relative to the character input interface to select a particular character in the character input interface, wherein the background image is acquired by a camera, and the determining a portion of the background image as a control region comprises: the control region being a specific object located in front of the camera and acquired into the background image.

15. The wearable device according to claim 14, wherein when the control region overlaps with the specific character, the specific character is input upon reception of an input trigger instruction.

16. The wearable device according to claim 15, wherein the trigger instruction is generated when at least one of following conditions is satisfied:

an overlapping time reaching a predetermined threshold;

a moving range of the control region relative to the specific character within a predetermined time being less than the predetermined threshold; and receiving a user input.

17. The wearable device of claim 14, the processor is further configured to perform:

deleting a character input a last time when a deleting instruction is received.

18. The wearable device of claim 17, wherein the deleting instruction is generated when at least one of following conditions is satisfied:

a camera being blocked;

the camera moving according to a predetermined motion mode;

receiving a user input.

* * * * *